United States Patent
Lim et al.

(10) Patent No.: US 12,128,588 B2
(45) Date of Patent: Oct. 29, 2024

(54) METHOD AND DEVICE FOR MANUFACTURING ARTIFICIAL MARBLE HAVING STRIPE PATTERN

(71) Applicant: LG HAUSYS, LTD., Seoul (KR)

(72) Inventors: Jung Min Lim, Marietta, GA (US); Jake Ha, Houston, TX (US); Thae Hoon An, Kennesaw, GA (US); Jin Seok Kwak, Marietta, GA (US)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 18/117,758

(22) Filed: Mar. 6, 2023

(65) Prior Publication Data

US 2023/0202078 A1 Jun. 29, 2023

Related U.S. Application Data

(62) Division of application No. 15/877,097, filed on Jan. 22, 2018, now Pat. No. 11,623,373.

(51) Int. Cl.

| | |
|---|---|
| *B29C 43/14* | (2006.01) |
| *B29B 7/32* | (2006.01) |
| *B29C 31/10* | (2006.01) |
| *B29C 43/06* | (2006.01) |
| *B29C 43/46* | (2006.01) |
| *B44F 9/04* | (2006.01) |
| *B29K 63/00* | (2006.01) |
| *B29K 67/00* | (2006.01) |

(Continued)

(52) U.S. Cl.
CPC ............ *B29C 43/145* (2013.01); *B29B 7/325* (2013.01); *B29C 31/10* (2013.01); *B29C 43/06* (2013.01); *B29C 43/46* (2013.01); *B44F 9/04* (2013.01); *B29K 2063/00* (2013.01); *B29K 2067/00* (2013.01); *B29K 2633/08* (2013.01); *B29K 2995/0021* (2013.01); *B29L 2031/702* (2013.01)

(58) Field of Classification Search
CPC ...... B29C 2043/3433; B29C 2043/486; B29C 31/10; B29C 43/06; B29C 43/145; B29C 43/34; B29C 43/46; B29C 43/48; B29C 39/02; B29C 39/023; B29C 39/06; B29C 39/12; B29B 7/325; B29K 2063/00; B29K 2067/00; B29K 2509/00; B29K 2633/08; B29K 2995/0021; B29L 2007/002; B29L 2031/10; B29L 2031/702; B44F 9/04
See application file for complete search history.

(56) References Cited

U.S. PATENT DOCUMENTS

| | | | |
|---|---|---|---|
| 8,017,051 B2 | 9/2011 | Choi | B29C 39/14 |
| | | | 264/73 |
| 2008/0032050 A1 | 2/2008 | Yoon | B29C 41/12 |
| | | | 427/385.5 |

FOREIGN PATENT DOCUMENTS

| | | |
|---|---|---|
| KR | 100619635 B1 | 8/2006 |
| KR | 20070113454 A | 11/2007 |
| KR | 100807973 B1 | 2/2008 |

(Continued)

OTHER PUBLICATIONS

KR20090100064A—Machine Translation (Year: 2009).
KR20070113454A—Machine Translation (Year: 2007).
KR20110074324A—Machine Translation (Year: 2011).

*Primary Examiner* — Yunju Kim
(74) *Attorney, Agent, or Firm* — Bryan Cave Leighton Paisner LLP

(57) ABSTRACT

The present invention relates to a method and device for manufacturing artificial marble. According to the present (Continued)

invention, artificial marble having a stripe pattern similar to that of natural stone, such as striato, may be provided.

10 Claims, 5 Drawing Sheets

(51) Int. Cl.
*B29K 633/04* (2006.01)
*B29L 31/00* (2006.01)

(56) References Cited

FOREIGN PATENT DOCUMENTS

| KR | 20090100064 A | 9/2009 |
| KR | 20110074324 A | 6/2011 |

METHOD AND DEVICE FOR MANUFACTURING ARTIFICIAL MARBLE HAVING STRIPE PATTERN

This application is a Divisional Application of U.S. patent application Ser. No. 15/877,097, filed on Jan. 22, 2018, all of which is hereby incorporated by reference in its entirety for all purposes as if fully set forth herein.

BACKGROUND

Field of the Invention

The present invention relates to a method and device for manufacturing artificial marble having a stripe pattern.

Discussion of Related Art

Artificial marble is more easily handled than natural marble, and is able to be manufactured by controlling a manufacturing process or composition so that a product has a desired appearance. Accordingly, artificial marble has been widely used to form wall or flooring materials for a building or the appearance of furniture such as a table. One of the most important characteristics of such artificial marble is its appearance. Particularly, realization of the texture or design, which is close to natural stone or totally different from that of a conventional product is an important task associated with the artificial marble.

Meanwhile, as a means for imparting a desired appearance to artificial marble, a method for using various sizes of pigments or chips having different colors from a base resin as described in Korean Patent No. 10-0807973, or a method for designing a device involved in any step in a process of manufacturing artificial marble as described in Korean Patent No. 10-0619635 has been known. However, even though it is artificial marble manufactured by the above-mentioned methods, its pattern is very different from that of natural marble.

SUMMARY OF THE INVENTION

The present invention is directed to providing a method and device for manufacturing artificial marble having a stripe pattern.

The present invention is also directed to providing artificial marble having a stripe pattern, which is similar to that of natural stone.

All of the objects of the present invention and other objects except these may be accomplished by the present invention which will be described in detail below.

Hereinafter, a method and device according to exemplary embodiments of the present invention will be described in detail with reference to accompanying drawings. For convenience of explanation, the size or shape of each configuration illustrated in the drawings may be exaggerated or reduced.

In one exemplary embodiment of the present invention, the present invention relates to a method for manufacturing artificial marble. The artificial marble manufactured according to the manufacturing method of the present invention may have a stripe pattern, which is very similar to that of natural stone, such as striato.

The manufacturing method of the present invention may include providing a plurality of slurries with different colors into a molding box partitioned to have a predetermined height on a belt moving in a first direction; and compressing and discharging a part of the slurry mixture provided into the molding box to be contained at the predetermined height at the lower side of the molding box in the first direction using a roller spaced a predetermined distance apart from the belt in a vertical direction.

The belt may be a movable steel belt that can be used in, for example, a casting method. The steel belt of the present invention moves in a first direction, and thereby the flow of slurries provided onto the belt in the first direction may be created. The first direction may refer to any direction that can be specified in the casting method, but the present invention is not particularly limited thereto.

According to the manufacturing method of the present invention, a plurality of slurries with different colors may be provided into the molding box. The molding box may have a predetermined height, and may be partitioned to have a certain region within the width and/or length of the belt. In addition, the bottom surface of the box may be formed by the belt. Accordingly, when a certain amount or more of slurries is provided, a mixture of the slurries may fill the molding box. Regarding the slurries, the slurries having different colors may refer to slurries that are visually observed as having different colors, and more specifically, by a yellowness index (YI), measured according to a known method, which varies for each slurry.

A part of the slurry mixture provided into the molding box may be compressed and discharged at the lower side of the molding box in the first direction. In this regard, in the manufacturing method of the present invention, a roller disposed at the side of the molding box in the first direction and spaced a predetermined distance apart from the belt in a vertical direction may be used. By the distance between the roller and the belt, the slurry mixture may be discharged from the molding box.

In an exemplary embodiment, the molding box may include a roller at a side of the molding box in the first direction. That is, the roller may partition the inner region of the molding box, and particularly, may define a boundary at the side of the molding box in the first direction. For example, as shown in FIG. 1, in the molding box, three sides may be partitioned by planar members having a predetermined height, and the remaining surface may be partitioned by the roller disposed at the side in the first direction. As described above, since the roller is spaced a predetermined distance (d) apart from the belt in a vertical direction, an amount of slurries corresponding to the separation distance may be compressed, and a predetermined amount of the slurries may be discharged out of the molding box. The distance between the roller and the belt is not particularly limited, and may be suitably controlled according to the thickness of a desired artificial marble product. While not particularly limited, a height (distance) at which the roller is spaced apart from the belt in a vertical direction may be 1 mm or more or 5 mm or more, and 60 mm or less or 50 mm or less.

The roller may be rotated in the same direction as a steel belt, that is, the first direction, and thereby, a part of the slurries contained in the molding box may be discharged in the first direction and compressed. The slurries compressed and discharged may be formed in a predetermined flat shape.

The manufacturing method of the present invention may be performed such that the flat-shape slurry mixture discharged at the side of the molding box in the first direction has a stripe pattern. Regarding this, as will be described below, the method of the present invention may be performed such that a plurality of slurries can be provided on a belt parallel to the first direction in a molding box, and such that a downflow of the slurries and an upflow of the slurries may be generated due to a vortex at the sides of the molding box in the first and second directions, respectively. Here, the second direction may refer to a direction substantially opposite to the first direction in which the belt moves. Specifically, referring to FIGS. 1(a) and 1(b) illustrating that a plurality of artificial marble slurries, which are different from each other, on a belt running leftward (the first direction) are provided into the molding box, and the artificial marble slurries fill the molding box to a certain extent, the manner of performing the method of the present invention will be explained as below. The flow of slurries in the upper portion of the slurries provided into the molding box 20 by a supply unit 30 due to a force in which the belt 10 moves in the first direction (leftward) and inertia generated thereby is created in a second direction (rightward), which is a direction relatively opposite to the first direction. Meanwhile, the slurries transferred in the second direction (rightward) are vertically circulated downward due to a vortex made by the belt 10 and thus are relatively transferred to the lower portion of the molding box 20, that is, close to the belt, and then the slurries close to the belt are transferred in the first direction (leftward) along the belt 10. Here, as described above, since the roller 21 capable of being rotated in the first direction (leftward) is present at the side of the molding box in the first direction while being spaced a predetermined distance (d) apart from the belt in a vertical direction, among the slurries transferred in the first direction (leftward) to the lower portion of the molding box along the belt, only an amount thereof corresponding to the separation distance (d) between the roller 21 and the belt 10 pass through the lower first side of the molding box, and the remaining slurries are circulated upward again. In addition, the flow of the slurries circulated upward without passing through the lower first side of the molding box is formed in a second direction (rightward). In such a circulation process, since the slurry mixture provided into the molding box has flows in the first direction and the second direction, a stripe pattern may be formed on the surface of the slurry mixture contained in the molding box. In addition, the slurries circulated in a vertical upward direction at the first side of the molding box and thus transferred in the second direction (rightward) may encounter other slurries just provided into the molding box, and then may be transferred in the second direction, thereby forming more stripe patterns. Since the stripe patterns formed thereby are caused by a naturally-occurring flow (vortex) between the transfer in the first direction and the transfer in the second direction, gradation between adjacent stripes may not be artificial, may be very similar to natural stone, and may have a natural look. Simply, by the method of providing the plurality of slurries onto the belt, a stripe pattern similar to that of natural stone may be realized as described herein.

According to an exemplary embodiment of the present invention, a slurry supply rate and a belt moving rate may be suitably controlled. Specifically, when the height of the slurry mixture contained in the molding box is larger than the vertical distance of the roller from the belt, as described above, the flows in the first and second directions may be created in the upper and lower portions of the slurry mixture contained in the molding box, thereby forming a natural stripe pattern, and the slurry supply rate and the belt moving rate may be suitably controlled such that the height of the artificial marble slurries contained in the molding box is larger than the distance of the roller spaced apart from the belt in a vertical direction. While not particularly limited, the belt moving rate may be controlled within a range of 1 m/min to 10 m/min, and when the belt moves at the above-mentioned rate, the entire slurries may be provided in the range of 10 kg/min to 150 kg/min.

In an exemplary embodiment, as shown in FIG. 1, the plurality of slurries may be provided via a plurality of nozzles crossing the first direction. Accordingly, each slurry may be provided into the molding box, and specifically, onto the belt partitioned by the molding box in parallel with the first direction.

In an exemplary embodiment, in the method of the present invention, slurries with various colors may be provided onto the belt using a supply unit having a line mixer and a plurality of nozzles. Specifically, the method of the present invention may further include injecting two types or more of slurries with different colors into a line mixer having two or more inlets and one outlet, and dividing the slurries partially mixed in the line mixer and providing the divided slurries into the plurality of nozzles, respectively. FIG. 2 is an image of a line mixer which can be used according to an exemplary embodiment of the present invention. It is obvious to those of ordinary skill in the art that, although the line mixture of FIG. 2(a) includes only two inlets, the number of inlets may be suitably controlled. The line mixer has a plurality of curved blades therein at both sides (left and right) as shown in FIG. 2(b), and the plurality of slurries input through the inlets may be partially mixed in the line mixer and then discharged through the outlet. The slurries discharged through the outlet of the line mixer may be transferred to a supply unit by means of a hose (not shown), and then distributed into a plurality of nozzles at a predetermined amount, respectively. Therefore, a larger number of colors than the slurries input into the line mixer may be provided onto the belt. Since the slurries partially, but not uniformly, mixed may be discharged from respective nozzles, each slurry discharged from each nozzle on the belt may have a different color so that various colors may be naturally realized in products. In the present invention, one or more line mixers having the above-mentioned function may be used.

In an exemplary embodiment, one or more slurries of the plurality of the slurries provided into the molding box may have a viscosity of 10 Ps to 100 Ps. When the above-mentioned range is satisfied, flowability and processability suitable for realizing the stripe pattern may be imparted to the slurry mixture. For examples, diffusion between different colors may be prevented, and curing may be suitably performed while a stripe pattern is maintained. The viscosity may be measured by a known method.

As long as the slurries exhibit different colors and have viscosity in the above-mentioned range, a specific composition of the slurries used herein is not particularly limited. For example, the slurries may include an acrylic resin, an unsaturated polyester-based resin or an epoxy-based resin as a base resin.

Specific examples of the acrylic resin are not particularly limited. For example, a polymer such as methyl (meth)acrylate, ethyl (meth)acrylate, butyl (meth)acrylate, 2-ethylhexyl (meth)acrylate, benzyl (meth)acrylate or glycidyl (meth)acrylate may be used as an acrylic resin. Here, the acrylic resin may be any one homopolymer of the above-mentioned monomers, or a copolymer of two or more monomers of the above-mentioned monomers or a copolymer of one or more of the above-mentioned monomers and a monomer other than these.

Specific examples of the unsaturated polyester resin are not particularly limited. For example, the unsaturated polyester resin may be prepared by a condensation reaction of a saturated and/or unsaturated dibasic acid, or a polyhydric alcohol, and may be a resin having an acid value of approximately 5 to 40, and a molecular weight of approximately 1,000 to 5,000. Examples of the saturated or unsaturated dibasic acid may be maleic anhydride, citraconic acid, fumaric acid, itaconic acid, phthalic acid, phthalic anhydride, isophthalic acid, terephthalic acid, succinic acid, adipic acid, sebacic acid and/or tetrahydrophthalic acid. In addition, examples of the polyhydric alcohol may be ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane monoarylether, neopentyl glycol, 2,2,4-trimethyl-1,3-pentanediol and/or glycerin.

The type of the epoxy resin is not particularly limited. For example, as the epoxy resin, a bifunctional or multifunctional epoxy resin may be used. Examples of the bifunctional or multifunctional epoxy resin may include a bisphenol-A type epoxy resin, a bisphenol-S type epoxy resin, a tetraphenyl ethane epoxy resin, or a phenol novolac-type epoxy resin.

In an exemplary embodiment, the slurry may further include an additive. The additive may be, for example, a crosslinking agent, a curing agent, an inorganic filler or a chip.

As the crosslinking agent, a known crosslinking agent may be used without limitation. For example, as the crosslinking agent, a multifunctional acrylic monomer such as ethylene glycol di(meth)acrylate, diethyleneglycol di(meth)acrylate, triethyleneglycol di(meth)acrylate, tetraethyleneglycol di(meth)acrylate, 1,6-hexanediol di(meth)acrylate, polybutyleneglycol di(meth)acrylate or neopentylglycol di(meth)acrylate may be used. Such a crosslinking agent may be included at 0.1 to 10 parts by weight with respect to 100 parts by weight of a base resin.

The specific type of the curing agent is not particularly limited. For example, as the curing agent, organic peroxides including a diacyl peroxide such as benzoyl peroxide or dicumyl peroxide; a hydroperoxide such as butyl hydroperoxide or cumylhydroperoxide; t-butyl peroxy maleic acid; t-butyl hydroperoxide; acetyl peroxide; lauryloyl peroxide; azobisisobutyronitrile; azobisdimethylvaleronitrile; t-butyl peroxyneodecanoate and/or t-amylperoxy 2-ethyl hexaonate may be used. A content of a polymerization initiator may be 0.1 to 10 parts by weight with respect to 100 parts by weight of the base resin, but the present invention is not particularly limited thereto. Other than these, in the present invention, radical carriers, for example, mercaptane compounds such as n-dodecyl mercaptane, tertiary-dodecyl mercaptane, benzyl mercaptane and/or trimethylbenzylmercaptane may also be used.

The slurries may include an inorganic filler. Examples of the inorganic filler that can be used in the present invention may include aluminum hydroxide, magnesium hydroxide and/or calcium aluminate. The inorganic filler may be included at 100 to 250 parts by weight with respect to 100 parts by weight of the base resin, but the present invention is not limited thereto. In addition, to improve dispersibility or prevent precipitation of the inorganic filler, or improve the mechanical strength of a product, the inorganic filler may be surface-treated with a silane-based coupling agent, a titanate-based coupling agent or stearic acid.

The method of the present invention may further include curing the slurry mixture discharged from the molding box. Specifically, by the flow of the slurries described above, a stripe pattern may be formed on the surface of the flat slurry mixture discharged at the lower portion of the molding box in the first direction, and the present invention may provide artificial marble having a stripe pattern very similar to that of natural stone by curing the flat slurry mixture having the stripe pattern. The curing method is not particularly limited, and thermal curing and/or photocuring may be performed according to components constituting the slurries. In an exemplary embodiment, the curing may be carried out while maintaining the temperature in a range of 40 to 150° C.

In another exemplary embodiment of the present invention, the present invention relates to a device for manufacturing artificial marble having a stripe pattern.

The device may be provided to perform the manufacturing method described above. Specifically, the device may include a belt moving in a first direction; a molding box disposed on the belt; and a supply unit capable of providing slurries with different colors into the molding box. Here, the molding box may have predetermined width and height to fill the molding box with the provided slurries. In addition, as described above, the molding box may include a roller disposed at the side of the molding box in the first direction and spaced a predetermined distance apart from the belt in a vertical direction.

As described above, the roller may be spaced apart from the belt in a vertical direction and rotated in the first direction like the belt such that a predetermined amount of the slurries is discharged out of the molding box.

In an exemplary embodiment, the supply unit may have, as shown in FIG. 1, a plurality of nozzles disposed across the first direction. The number of nozzles is not particularly limited, and for example, may be 2 to 15, or 5 to 10. The distance between the nozzles is not particularly limited, and may be suitably controlled according to a desired stripe pattern.

In an exemplary embodiment, the supply unit may be disposed so that the position and height of each nozzle may be changed. According to such a configuration, products having stripe patterns with various textures may be produced.

In an exemplary embodiment, the device may further include a line mixer. The line mixer may partially mix two or more slurries with different colors as described above. For example, slurries may be provided to a certain inlet of the line mixer from a source tank (not shown) including one type of slurry through a hose or nozzle, and the line mixer transfers a partial mixture of two or more types of slurries with different colors, which are input from two or more inlets, to a supply unit, and the supply unit allows the two or more types of slurries with different colors to be provided into the box across and parallel to the first direction through a plurality of nozzles of the supply unit. In an exemplary embodiment, the number of nozzles for providing slurries onto the belt may be larger than the number of the inlets of the line mixer.

In an exemplary embodiment, the supply unit may include, as shown in FIG. 1(b), a first supply unit 31 and a second supply unit 32. Each of the supply units 31 and 32 may allow slurries distributed from different line mixers to be provided into the molding box.

In an exemplary embodiment, the device may further include a curing device for curing a flat slurry mixture discharged from the molding box and having a stripe pattern. The configuration of the curing device is not particularly limited, and may include a light irradiator and/or a heat irradiator. The light irradiator and/or heat irradiator may be disposed in any one housing (not shown) formed on a steel belt.

TECHNICAL EFFECTS

According to an exemplary embodiment of the present invention, artificial marble having a stripe pattern similar to that of natural stone, that is, striato can be provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the present invention will be described in detail with reference to an example. However, the scope of the present invention is not limited by the example described below.

Example

Figure 1A:
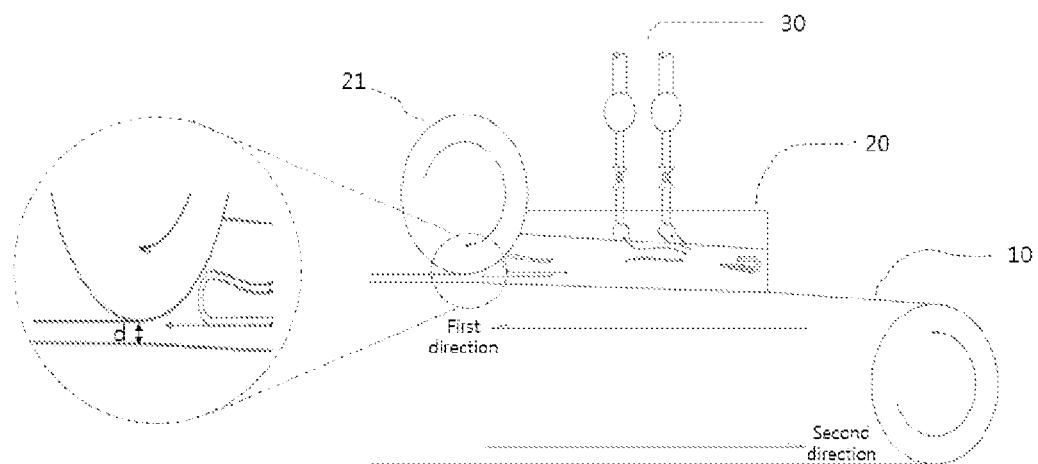
FIGS. 1a and 1b schematically illustrate a method and device for manufacturing artificial marble according to an exemplary embodiment of the present invention.
Figure 1B:
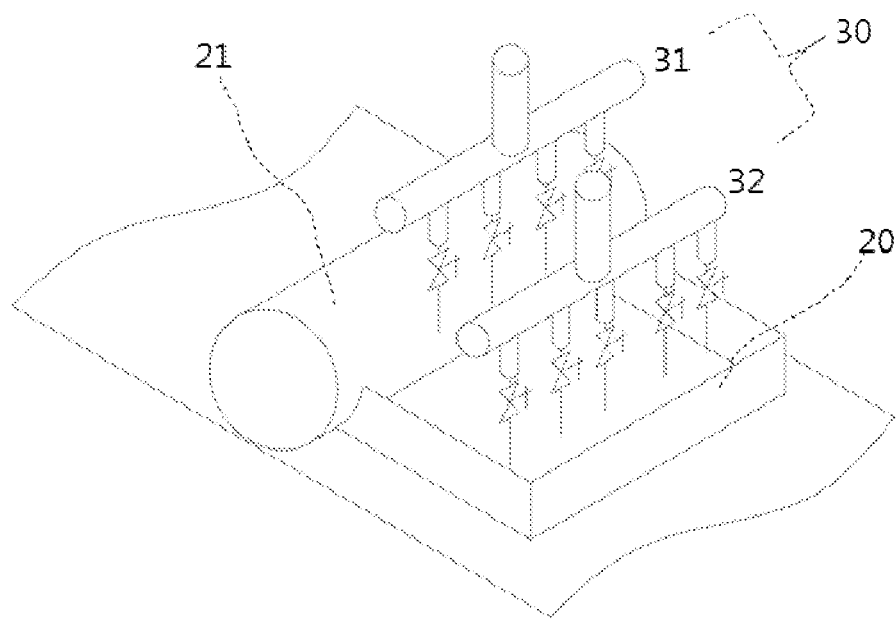
Figure 2A:
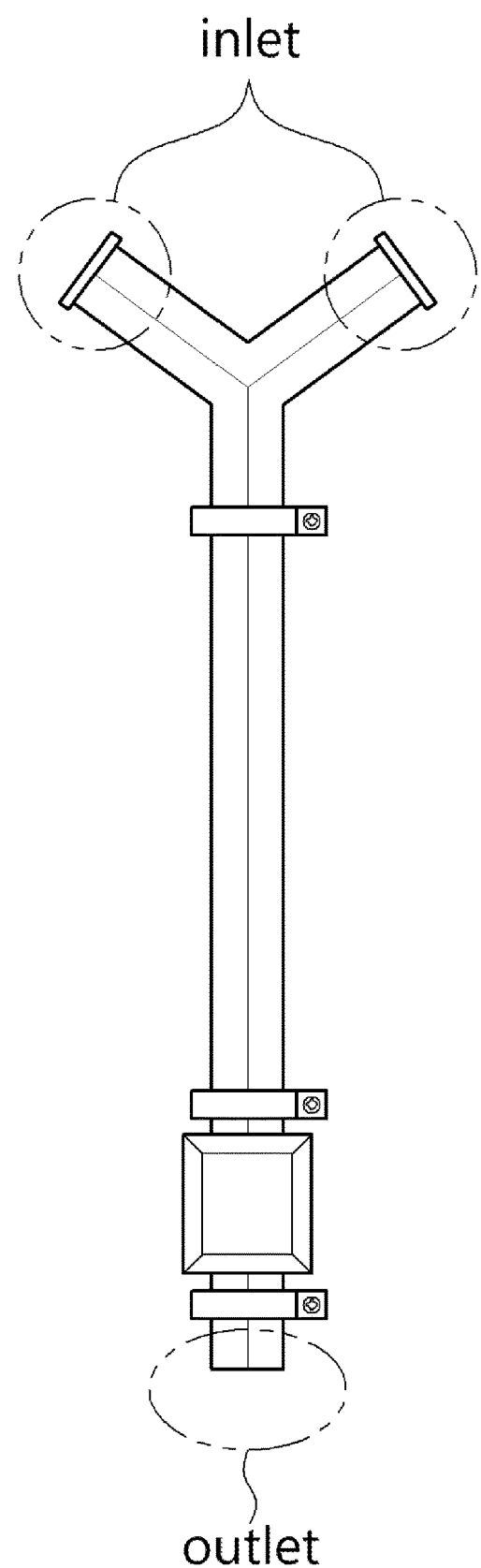
FIGS. 2a and 2b show images of a line mixer that can be used according to an exemplary embodiment of the present invention.
Figure 2B:
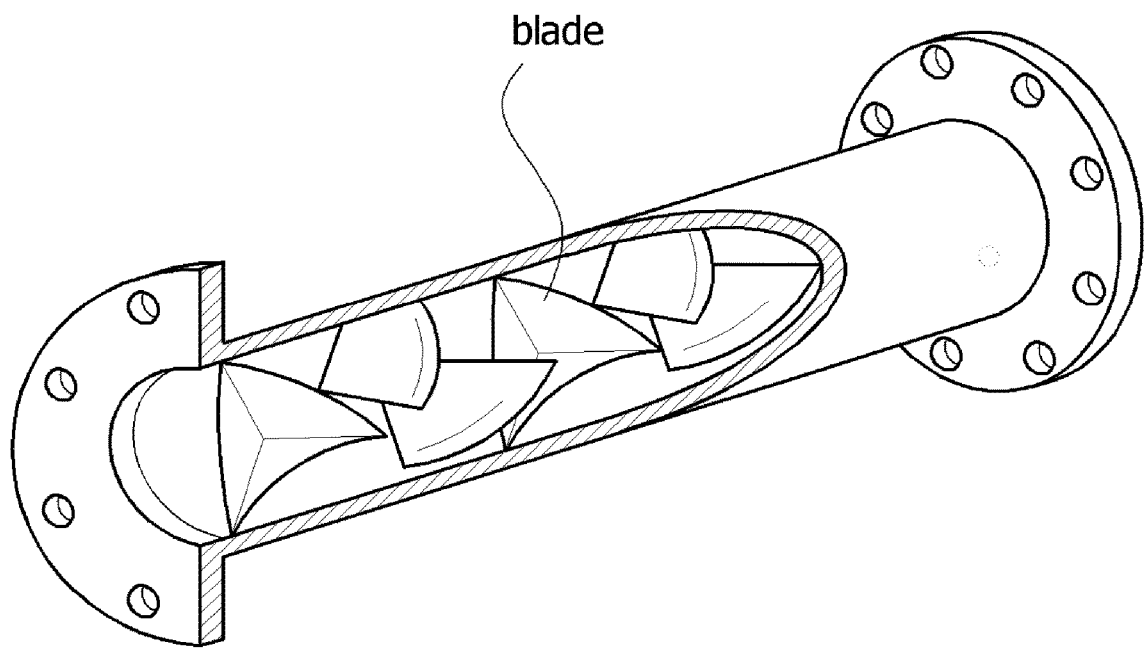
Figure 3A:
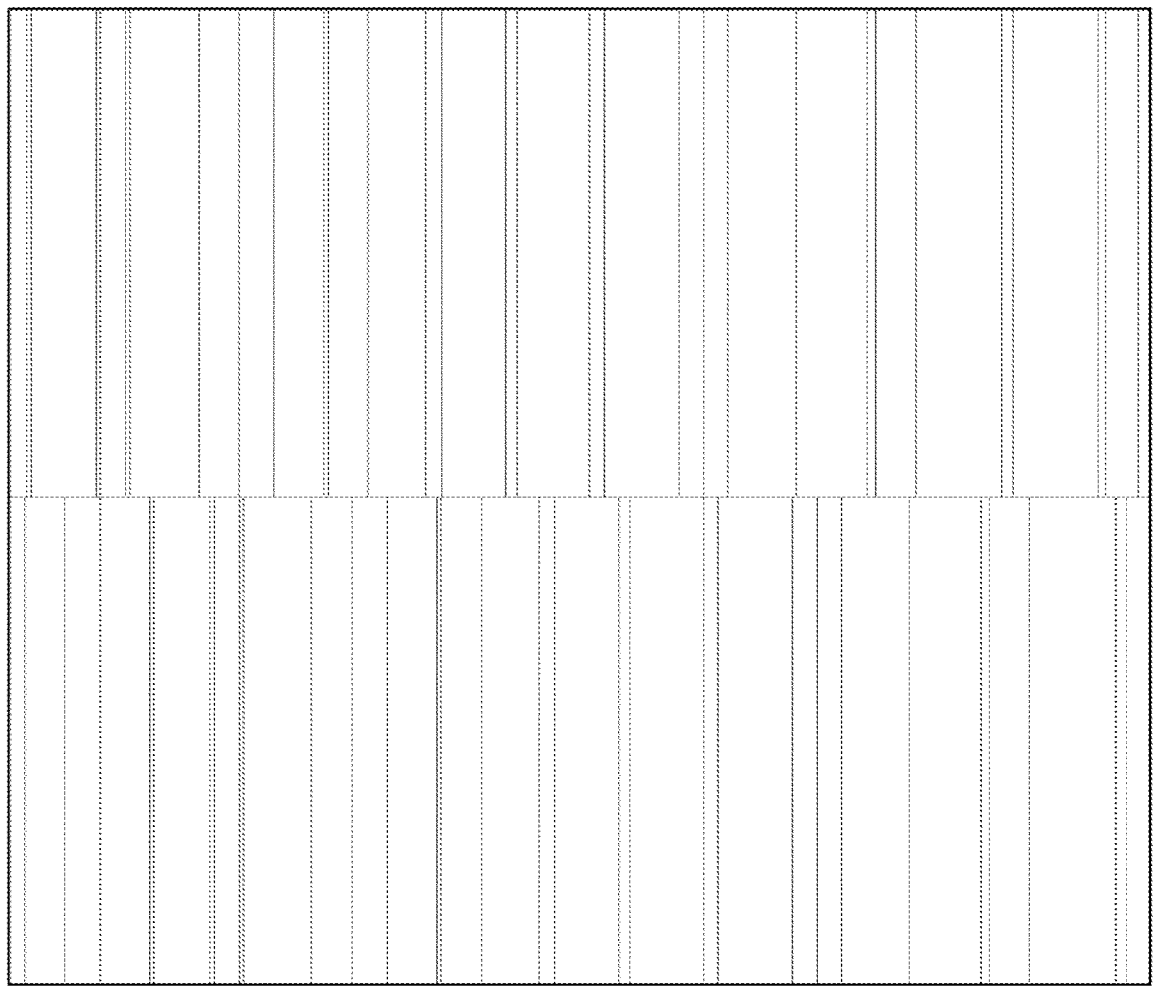
FIGS. 3a and 3b show images of comparing patterns of artificial marble manufactured according to an exemplary embodiment of the present invention and natural stone.
Figure 3B:
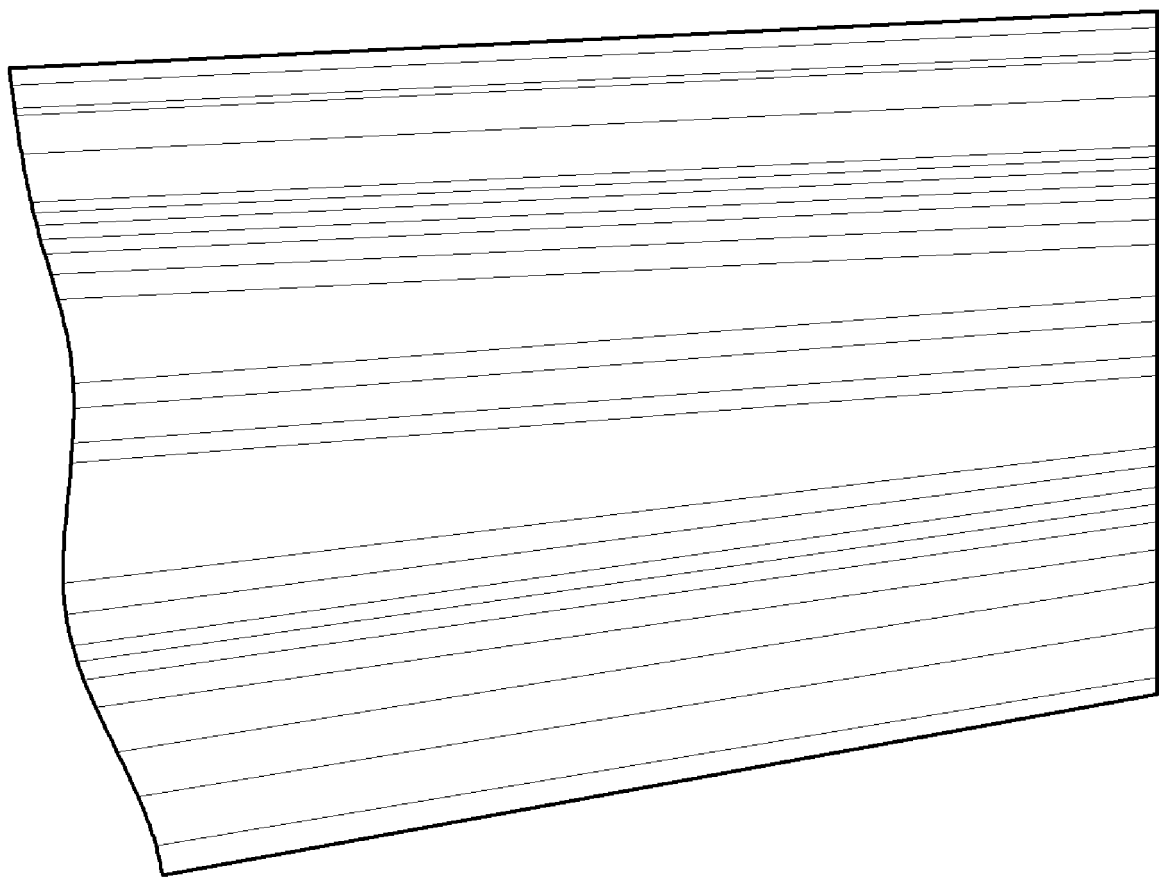

A first raw material which includes an acrylic resin, aluminum hydroxide and an additive and visually recognized as white was prepared. Likewise, a second raw material which includes an acrylic resin and aluminum hydroxide and visually recognized as gray was prepared. The first and second raw materials were input to a first raw material tank and a second raw material tank, respectively. In addition, the raw materials contained in the first and second raw material tanks were partially mixed in a first line mixer with two inlets, and separately, the raw materials contained in the first and second raw material tanks were also mixed in a second line mixer with two inlets. Afterward, 8 slurries with different colors were provided from a first supply unit and a second supply unit, each of which was linked to each line mixer and had four nozzles, using the device shown in FIG. 1. A belt moving rate was controlled to 1 to 10 m/min, and the distance of a roller spaced apart from the belt was controlled to approximately 10 to 15 mm, and a stripe pattern was formed by controlling a slurry supply rate and the belt moving rate to fill a molding box with a slurry mixture to a height of approximately 40 mm to 60 mm. The flat slurry mixture extracted from the molding box was cured, and then a picture was taken thereof. An image of the finally-cured product is shown in FIG. 3(a). It can be confirmed that the texture of the product is very similar to that of natural stone, such as striato shown in FIG. 3(b).

According to an exemplary embodiment of the present invention, artificial marble having a stripe pattern similar to that of natural stone, that is, striato can be provided.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for manufacturing artificial marble having a stripe pattern, comprising:
   providing a plurality of slurries with different colors into a molding box partitioned to have a predetermined height on a belt moving in a first direction; and
   compressing and discharging a part of the slurry mixture contained in the molding box at a predetermined height at a lower portion of the molding box at a side of the molding box in the first direction using a roller spaced a predetermined distance from the belt in a vertical direction,
   wherein the predetermined height of the molding box is greater than the predetermined distance of the roller from the belt in the vertical direction, and
   wherein a surface of the slurry contained in the molding box has the stripe pattern based on a downflow and an upflow of the slurry.

2. The method of claim 1, wherein the molding box comprises the roller at a side in the first direction, and the roller is rotated in the first direction.

3. The method of claim 2, which is performed to create a flow of slurries descending along a second direction sidewall by the second direction sidewall of the molding box and the belt moving in the first direction, and
   which is performed to create an ascending flow of a part of slurries that are not discharged from the lower portion of the molding box at the first side by the roller which is spaced a predetermined distance apart from the belt and forms a first direction sidewall of the molding box.

4. The method of claim 1, wherein a slurry supply rate and a belt moving rate are controlled so that a height of the slurry mixture contained in the molding box, is greater than the distance between the roller and the belt, which are spaced apart in the vertical direction.

5. The method of claim 1, wherein the plurality of slurries with different colors are provided into the molding box parallel to the first direction by means of a plurality of nozzles disposed across the first direction.

6. The method of claim 5, further comprising:
   adding two or more types of slurries with different colors to a line mixer having two or more inlets and one outlet, and distributing the slurries partially mixed in the line mixer to be provided to the plurality of nozzles.

7. The method of claim 1, wherein one or more slurries of the plurality of slurries provided into the molding box have a viscosity of 10 Ps to 100 Ps.

8. The method of claim 7, wherein one or more slurries of the plurality of slurries provided into the molding box include an acrylic resin, an unsaturated polyester-based resin or an epoxy-based resin.

9. The method of claim 8, wherein one or more slurries of the plurality of slurries provided into the molding box further include a crosslinking agent, a curing agent, an inorganic filler or a chip.

10. The method of claim 1, further comprising:
    curing a flat slurry mixture discharged from the molding box and having the stripe pattern.

* * * * *